(12) United States Patent
Kim et al.

(10) Patent No.: US 7,568,263 B2
(45) Date of Patent: Aug. 4, 2009

(54) HINGE APPARATUS AND WATCH TYPE PORTABLE TERMINAL HAVING THE SAME

(75) Inventors: Tae-Yun Kim, Gumi-si (KR); Jong-Gun Bae, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 725 days.

(21) Appl. No.: 11/101,456

(22) Filed: Apr. 8, 2005

(65) Prior Publication Data

US 2005/0272486 A1    Dec. 8, 2005

(30) Foreign Application Priority Data

May 11, 2004    (KR) .................... 10-2004-0033007

(51) Int. Cl.
*A44C 5/00*    (2006.01)
*A44C 5/14*    (2006.01)

(52) U.S. Cl. ............................ 24/265 B; 24/265 WS; 368/282

(58) Field of Classification Search .............. 368/88, 368/281, 282; 24/265 B; 224/174, 172, 224/179; 63/3, 9, 10
See application file for complete search history.

(56) References Cited

U.S. PATENT DOCUMENTS

| | | | | |
|---|---|---|---|---|
| 2,028,791 A | * | 1/1936 | Lynds | 224/174 |
| 2,566,691 A | * | 9/1951 | Bristol | 267/159 |
| 2,765,108 A | * | 10/1956 | Doerwald | 224/174 |
| 2,780,400 A | * | 2/1957 | Lancaster et al. | 224/174 |
| 2,827,213 A | * | 3/1958 | Cornu | 224/174 |
| 2,996,899 A | * | 8/1961 | Donle | 63/9 |
| 4,255,801 A | * | 3/1981 | Ode et al. | 368/10 |
| 5,008,864 A | * | 4/1991 | Yoshitake | 368/10 |
| 5,020,039 A | * | 5/1991 | Yokote | 368/282 |
| 5,381,387 A | * | 1/1995 | Blonder et al. | 368/10 |
| 5,467,324 A | * | 11/1995 | Houlihan | 368/10 |
| 6,158,884 A | * | 12/2000 | Lebby et al. | 368/282 |
| 6,535,461 B1 | * | 3/2003 | Karhu | 368/10 |
| 6,549,791 B1 | | 4/2003 | Jeon et al. | |
| 2002/0104192 A1 | * | 8/2002 | Iguchi et al. | 16/386 |
| 2002/0104200 A1 | * | 8/2002 | Iguchi et al. | 24/265 WS |

FOREIGN PATENT DOCUMENTS

CN    1352908    6/2002

* cited by examiner

*Primary Examiner*—Robert J Sandy
(74) *Attorney, Agent, or Firm*—Roylance, Abrams, Berdo & Goodman, L.L.P.

(57) ABSTRACT

A hinge apparatus includes a substantially cylindrical holder having at least one guide hole with a predetermined degree slope that extends in a longitudinal direction. A hinge shaft includes a substantially cylindrical surface configured to linearly move in the longitudinal direction of the holder. A guide pin has an end located inside the guide hole and is configured to extend through the cylindrical surface of the hinge shaft. Therefore, when the hinge shaft moves linearly in the holder, the guide pin moves along the guide hole so that the hinge shaft rotates in the holder.

22 Claims, 9 Drawing Sheets

HINGE APPARATUS AND WATCH TYPE PORTABLE TERMINAL HAVING THE SAME

CROSS-REFERENCE TO RELATED APPLICATIONS

This application claims the benefit under 35 U.S.C. § 119 (a) of Korean Application No. 2004-33007, entitled "Hinge Apparatus and Watch Type Portable Terminal Therewith," filed on May 11, 2004, the entire disclosure of which is hereby incorporated by reference.

BACKGROUND OF THE INVENTION

1. Field of the Invention

The present invention relates generally to a portable terminal. More particularly, the present invention relates to a hinge apparatus for wearing a watch type portable terminal on the body, such as on the wrist, by engaging at least two housings that rotate against each other.

2. Description of the Related Art

Typically, depending upon their external appearance, portable terminals may be classified into bar type terminals, flip type terminals, or folder type terminals.

A bar type portable terminal is comprised of one body housing including a data input/output device, a mouthpiece, and an earpiece. Since a data input keypad is always exposed, a key is often contacted by mistake. Moreover, minimizing the size of the terminal is limited due to a problem of securing a distance between the mouthpiece and the earpiece.

A flip type portable terminal is comprised of a body element, a flip element, and a hinge module to connect the body element and the flip element to each other. In the flip type portable terminal, the body element includes a data input/output means, a mouthpiece, and an earpiece. Since the flip element covers up a data input keypad, erroneous operation of the keypad may be prevented. However, minimizing the size of the terminal is also limited due to a problem of securing a distance between the mouthpiece and the earpiece.

A folder type portable terminal is comprised of a body element, a folder, and a hinge module to rotate the folder at one end of the body element and opening/closing the folder with respect to the body element. In a state in which the folder covers up the body element such as in an idle mode, erroneous operation of the keypad may be prevented. In a call mode, a distance between a mouthpiece and an earpiece may be sufficiently secured by opening the folder with respect to the body element. Thus, minimizing the size of the terminal is possible. Therefore, folder type portable terminals are becoming the preferable type of portable terminal.

As portable terminals are popularized and the portable terminals are variably designed according to user preference, sliding type terminals, popup type terminals, and swing type terminals are also being put on the market. Also, as the portable terminals are minimized in size and reduced in weight, wrist-wearable watch type portable terminals are being proposed.

A watch type portable terminal is disclosed in U.S. Pat. No. 6,549,791, issued on Apr. 15, 2003, granted to the applicant, the entire disclosure of which is hereby incorporated by reference. The disclosed watch type portable terminal may be worn around the wrist by using a hinge apparatus. The hinge apparatus is used to connect a body element and a battery pack holder to each other by attaching bands to the body element and the battery pack holder.

However, since a body element of a conventional watch type portable terminal must be relatively small to be easily worn around the wrist, it is relatively difficult to install a data input/output device in the body element. Furthermore, a belt of a conventional watch is used to wear the portable terminal around the wrist. Therefore, an external appearance of the conventional watch belt is not properly harmonized with the body element, and the conventional watch belt merely provides a means to wear the portable terminal around the wrist.

Accordingly, there is a need for a watch type portable terminal in which a data input/output device may be simply installed and that rotatably engages at least two housings in order to easily wear the watch type portable terminal around the wrist.

SUMMARY OF THE INVENTION

An aspect of the present invention is to solve at least the above problems and/or disadvantages and to provide at least the advantages described below. Accordingly, an aspect of the present invention is to provide a watch type portable terminal in which a data input/output device may be simply installed.

Another object of the present invention is to provide a hinge apparatus, which is properly harmonized with a watch type portable terminal and is used to rotatably engage at least two housings in order to easily wear the watch type portable terminal around the wrist and the watch type portable terminal therewith.

According to one aspect of the present invention, a hinge apparatus of a portable terminal includes a substantially cylindrical holder having at least one guide hole with a predetermined degree slope that extends in a longitudinal direction. A hinge shaft including a substantially cylindrical surface configured to linearly move in the longitudinal direction of the holder. A guide pin having an end is located inside the guide hole. The guide pin is configured to extend through the cylindrical surface of the hinge shaft. Therefore, if the hinge shaft moves linearly in the holder, the guide pin moves along the guide hole so that the hinge shaft rotates in the holder.

According to another aspect of the present invention, a watch type portable terminal includes a first housing and a second housing which is engaged with one end of the first housing to rotate in a direction toward or away from the first housing over a predetermined angular range. A third housing engages with the other end of the first housing and is spaced apart from the second housing. The second and third housings are configured to face each other. A hinge apparatus rotatably engages the second housing with the first housing. The hinge apparatus is used to adjust a standoff distance between the second housing and the third housing.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, and features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF THE EXEMPLARY EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Figure 1:
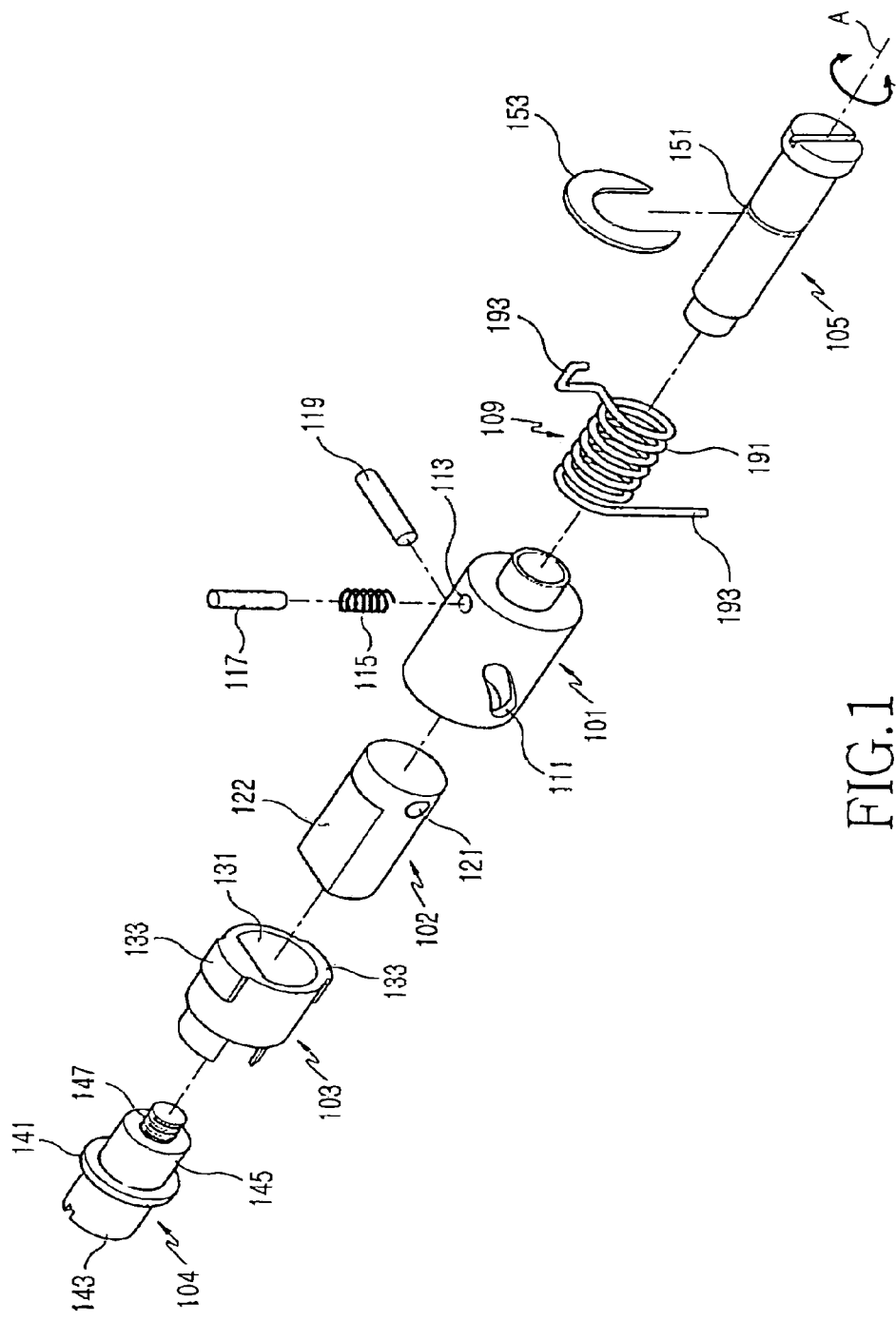
FIG. 1 is a disassembled perspective view illustrating a hinge apparatus of a watch type portable terminal in accordance with an embodiment of the present invention.
Figure 2:
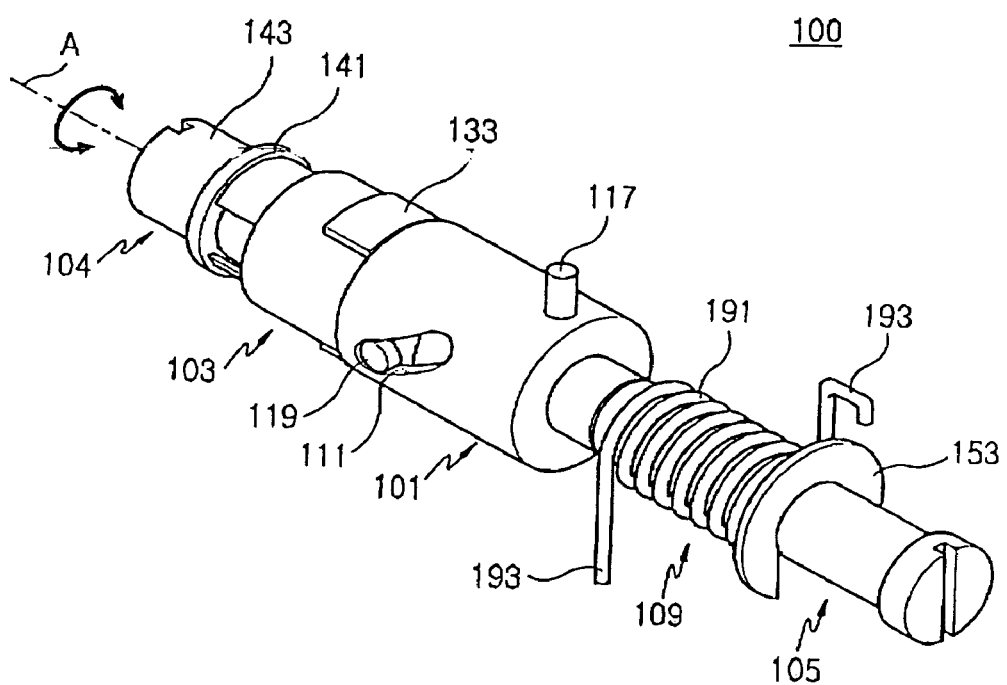
FIG. 2 is an assembled perspective view of the hinge apparatus shown in FIG. 1.

FIG. 1 is a disassembled perspective view illustrating a hinge apparatus 100 of a watch type portable terminal in accordance with an embodiment of the present invention. FIG. 2 is an assembled perspective view of the hinge apparatus 100 shown in FIG. 1. Referring to FIGS. 1-2, the hinge apparatus 100 includes a holder 101, a hinge shaft 102, a bushing 103, an adjusting screw 104, and a supporting screw 105.

The holder 101 is preferably substantially cylindrically shaped. One end of the holder 101 is open and the other end is closed. The holder 101 includes at least one guide hole 111. The at least one guide hole 111 extends in a longitudinal direction with a predetermined degree of slope. A fixing pin 117 is assembled on the holder 101 to extend in and out of the outer cylindrical surface of the holder 101 preferably by elasticity. The guide hole 111 extends through the holder 101 and penetrates through the outer and inner cylindrical surfaces of the holder 101. However, the guide hole 111 may be a recess formed on the inner cylindrical surface of the holder 101 with a predetermined depth.

The hinge apparatus 100 provides a hinge axis A. Hinge axis A extends in a longitudinal direction and passes through the center of the holder 101. A pair of guide holes 111 are symmetrically formed and centered around the hinge axis A.

In order to assemble the fixing pin 117 on the holder 101, a pin hole 113 is formed on the outer cylindrical surface of the holder 101. A coil spring 115 is first inserted in the pin hole 113, and then the fixing pin 117 is inserted in the pin hole 113. Accordingly, the fixing pin 117 extends into the pin hole 113 by an external force or extends out of the outer cylindrical surface of the holder 101 preferably by the elasticity of the coil spring 115.

The hinge shaft 102 extends in the direction of the hinge axis A. A portion of the hinge shaft 102 is inserted in the holder 101. The hinge shaft 102 may be moved linearly and rotatably. A coupling hole 121 extends through the hinge shaft 102 in a diametrical direction from one side of the hinge shaft 102 portion that is inserted in the holder 101. A guide pin 119 is assembled through the coupling hole 121. The guide pin 119 is inserted in the coupling hole 121 through the guide holes 111 from one side of the holder 101. Both ends of the guide pin 119 protrude from the cylindrical surface of the hinge shaft 102 and are located inside the guide holes 111. Therefore, when the hinge shaft 102 linearly moves, both ends of the guide pin 119 move along a respective guide holes 111. Thus the hinge shaft 102 rotates. In a case where the guide holes 111 are recesses formed on the inner cylindrical surface of the holder 101, the guide pin 119 is preferably formed as a projection which may extend in and out and is assembled on the cylindrical surface of the hinge shaft 102. Similarly to the fixing pin 117 assembled on the holder 101, the projections assembled on the hinge shaft 102 preferably extend in and out by the elasticity of coil springs.

A plane 122 is formed on the cylindrical surface of the other portion of the hinge shaft 102 and protrudes from one end of the holder 101. That is, since the plane 122 extends along a predetermined length from one end of the hinge shaft 102, a sectional shape is preferably formed similar to the letter 'D.'

The bushing 103 is assembled so as to cover the cylindrical surface of the hinge shaft 102 and protrudes from one end of the holder 101. To accomplish this, the bushing 103 includes a through-hole 131 that extends in the direction of hinge axis A. The through-hole 131 preferably has a shape corresponding to the sectional shape of the hinge shaft 102. The bushing 103 rotates along with the rotation of the hinge shaft 102 and also linearly moves on the hinge shaft 102. On the outer cylindrical surface of the bushing 103, at least one coupling projection 133 is formed.

The sectional shape of the hinge shaft 102 is preferably formed in a shape substantially similar to the letter 'D' to form the plane 122 on the hinge shaft 102. The shape of the through-hole 131 of the bushing 103 is preferably formed to correspond to the sectional shape of the hinge shaft 102 to make the hinge shaft 102 and the bushing 103 rotate together. However, alternative suitable arrangements and constructions may be utilized. Therefore, changes to the sectional shape of the hinge shaft 102 and the shape of the through-hole 131 of the bushing 103 may be made. For example, a pair of planes may be symmetrically formed on the cylindrical surface of the hinge shaft 102. Moreover, the sectional shape of the hinge shaft 102 may be formed as a polygonal type shaped instead of a substantially circular type.

The adjusting screw 104 includes a supporting plate 141 facing one end of the bushing 103. An adjusting head 143 extends from one side of the supporting plate 141. An adjusting shaft 145 extends from the other side of the supporting plate 141 and is screwed to the one end of the hinge shaft 102. A screw thread 147 is formed on the cylindrical surface of an edge of the adjusting shaft 145. Thus, when the adjusting screw 104 is rotated, the hinge shaft 102 moves linearly.

When the hinge apparatus is assembled to the portable terminal, a distance between the holder 101 and the adjusting screw 104 is substantially uniform. In this state, if the adjusting screw 104 rotates, the hinge shaft 102 linearly moves along a pitch of the screw thread 147. As described above, when the hinge shaft 102 linearly moves, the hinge shaft 102 rotates in the holder 101 by the guide pin 119 and the guide holes 111.

The end of the supporting screw 105 extends in the direction of the hinge axis A and is in contact with the other end of the holder 101. A locking groove 151 is formed on the cylindrical surface of the supporting screw 105 in a circumferential direction. A stopper washer 153 is coupled to the locking groove 151. When the hinge apparatus is assembled to the portable terminal, the supporting screw 105 limits the holder 101 from moving in the direction of the hinge axis A.

A torsion spring 109 is assembled around the supporting screw 105. The torsion spring 109 includes a coil part 191. The coil part 191 is assembled around the cylindrical surface of the supporting screw 105. The coil part is assembled by winding a spring wire and a pair of free ends 193, each of which is extends from the coil part 191, a predetermined amount of turns.

Figure 3:
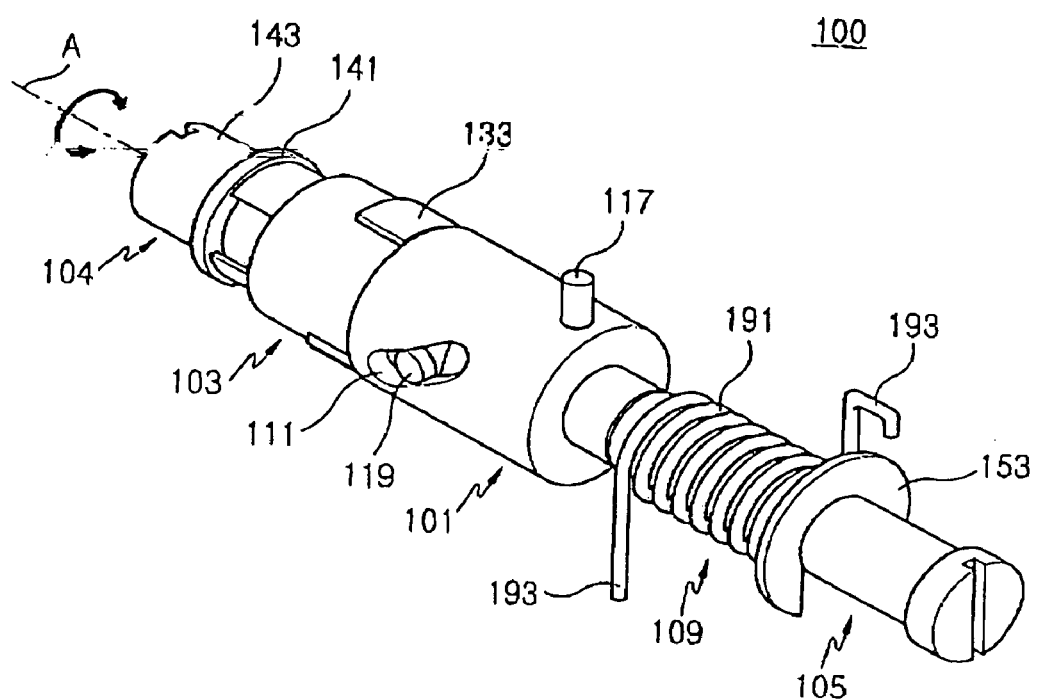
FIGS. 3-5 are perspective views illustrating an operation of the hinge apparatus shown in FIG. 2.
Figure 4:
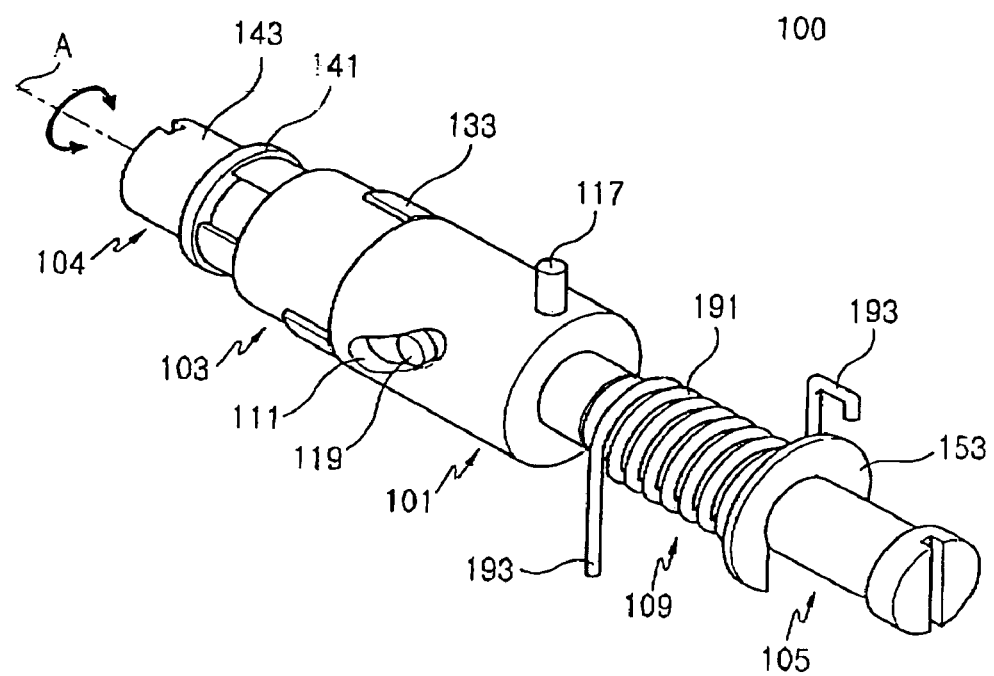
Figure 5:
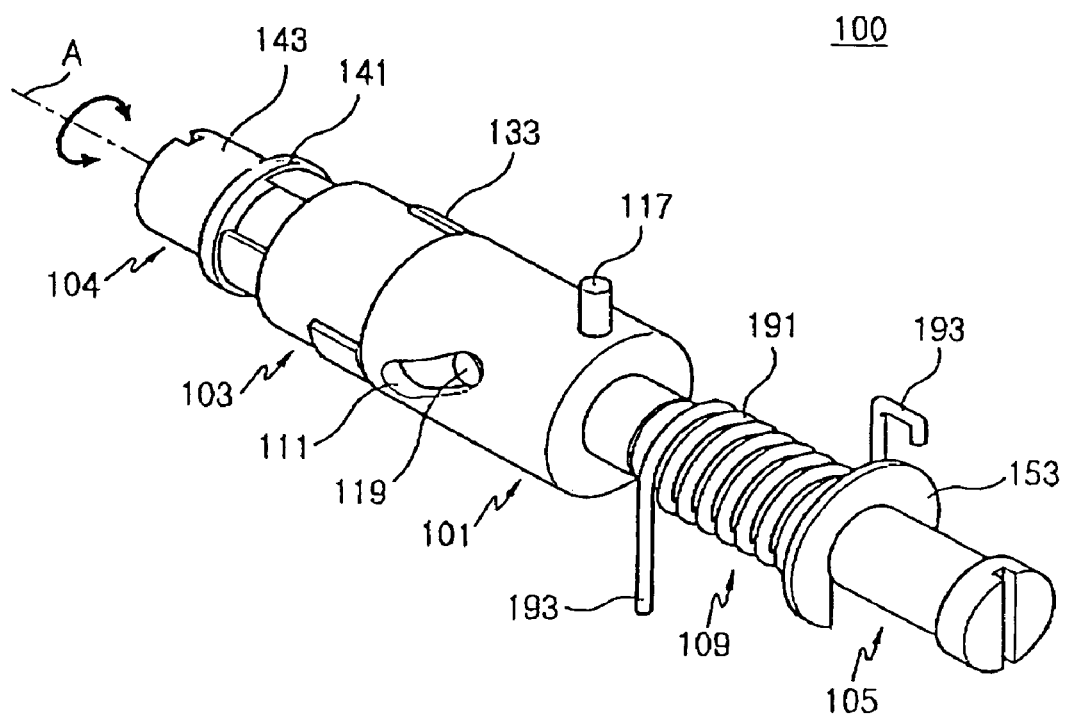

The hinge apparatus 100 rotates with at least the holder 101, the hinge shaft 102, the bushing 103, and the adjusting screw 104 on the hinge axis A. If a user turns the adjusting screw 104, the hinge shaft 102 linearly moves in the direction of the hinge axis A and simultaneously rotates inside the holder 101 as shown in FIGS. 3-5.

Referring to FIGS. 2-5 in sequence, when a user turns the adjusting screw 104, the hinge shaft 102 gradually moves in the direction of the hinge axis A. Then, since the guide pin 119 moves along the guide holes 111, the hinge shaft 102 rotates inside the holder 101 on the hinge axis A. Also, since the bushing 103 is rotatably coupled with the hinge shaft 102, the bushing 103 rotates as well.

Figure 6:
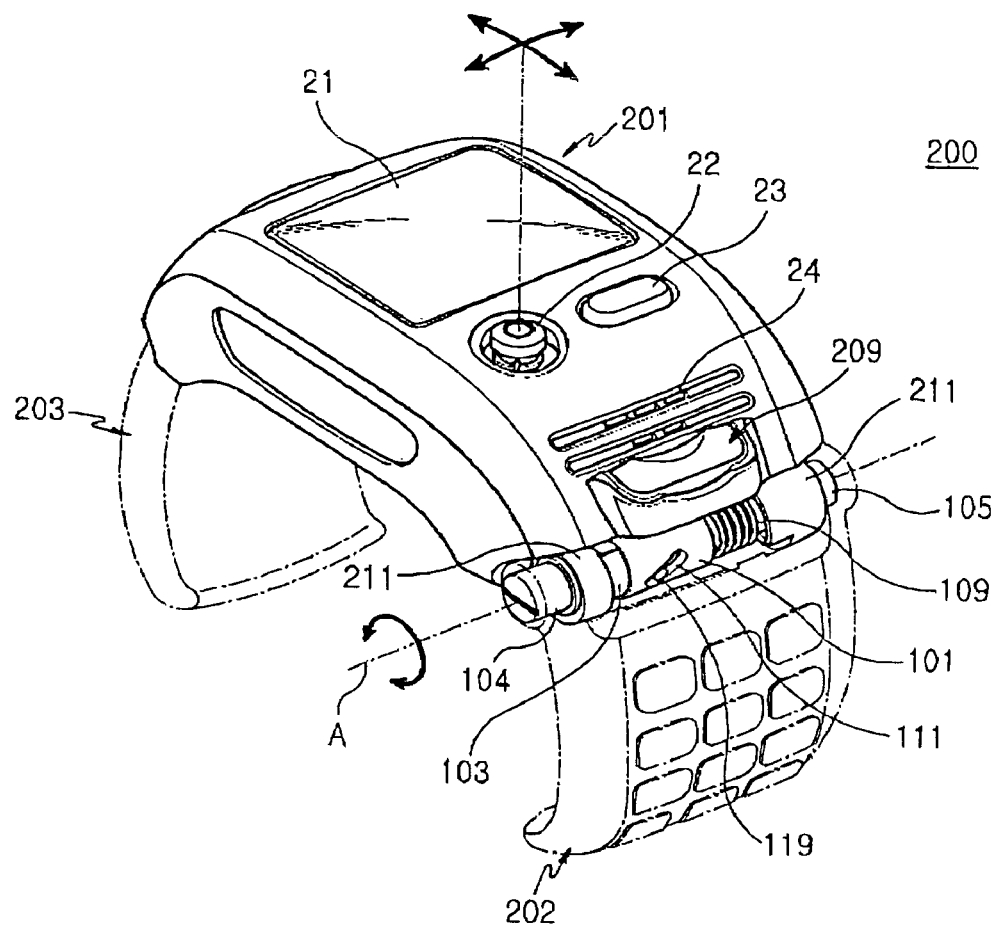
FIG. 6 is a perspective view illustrating a state in which the hinge apparatus shown in FIG. 1 is engaged with a first housing.
Figure 7:
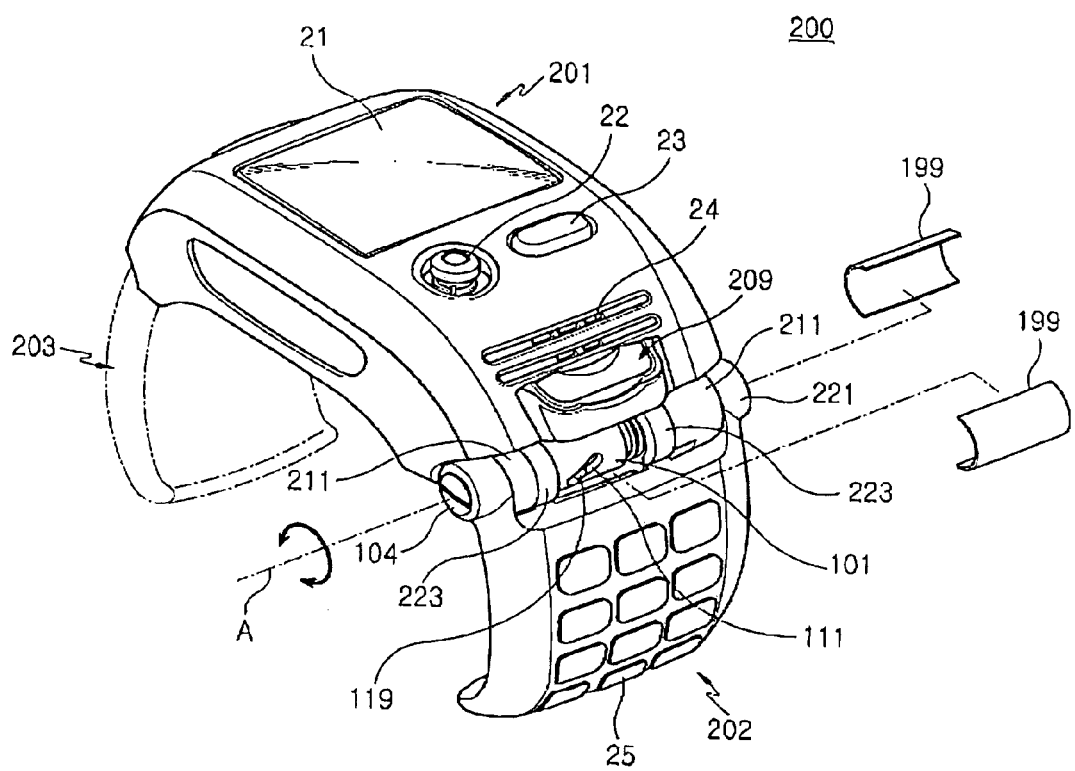
FIG. 7 is a perspective view illustrating a state in which a second housing is engaged with the first housing using the hinge apparatus shown in FIG. 1.
Figure 8:
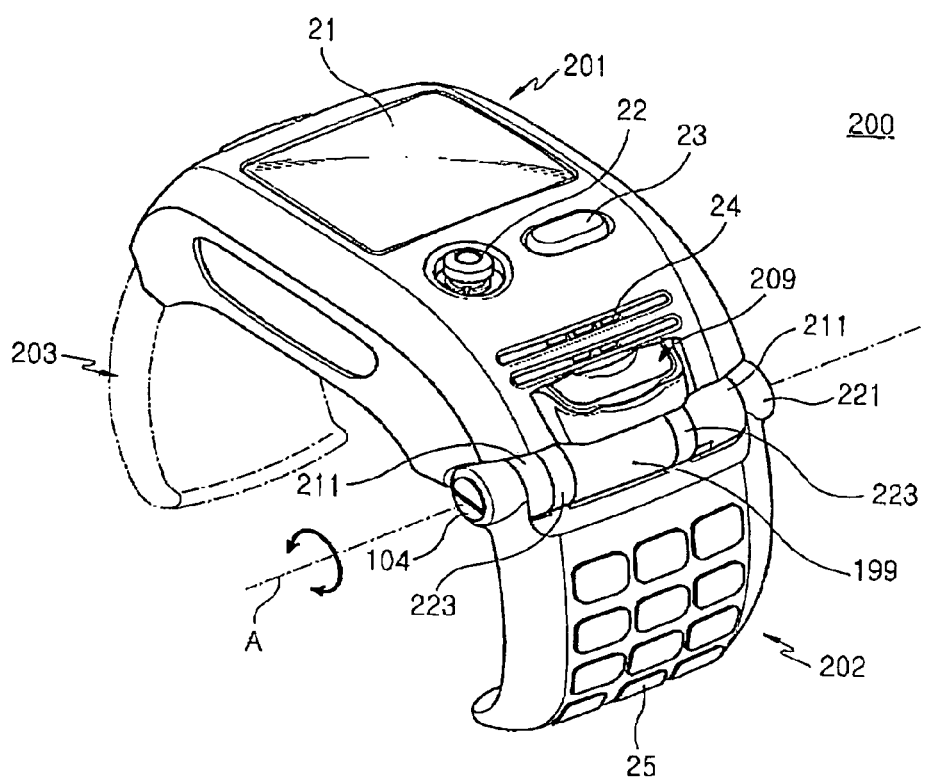
FIG. 8 is a perspective view illustrating a state in which a hinge cover is engaged after the second housing is engaged with the first housing using the hinge apparatus shown in FIG. 1.
Figure 9:
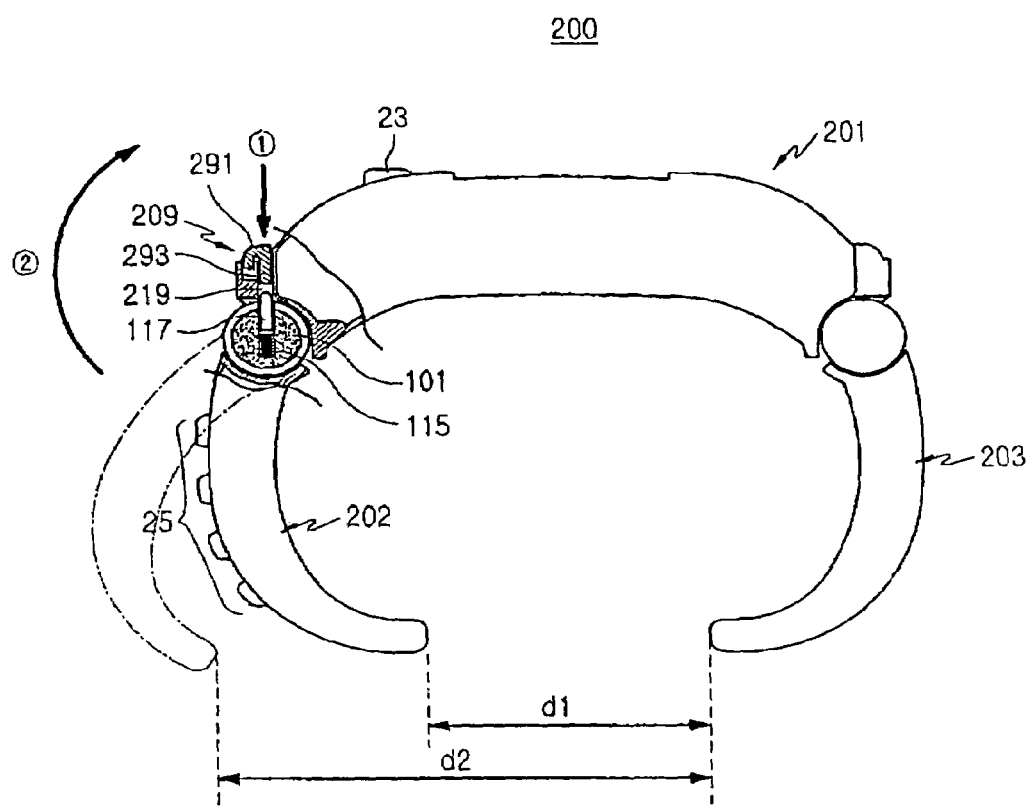
FIG. 9 is a side sectional view illustrating the watch type portable terminal shown in FIG. 8.

FIGS. 6-8 are perspective views illustrating that a second housing 202 is engaged with a first housing 201 using the hinge apparatus 100 shown in FIG. 1. FIG. 9 is a side sectional view illustrating a watch type portable terminal 200 having the hinge apparatus 100.

The watch type portable terminal 200 includes the first housing 201, the second housing 202, and a third housing 203. The second and third housings 202, 203 are engaged to the first housing 201 and configured to face each other at locations apart from one another. The portable terminal 200 is preferably curved so that a user may wear the portable terminal 200 around the wrist by assembling the second and third housings 202, 203 to both ends of the first housing 201, respectively.

A display device 21, a 4-way key 22 to enable four-direction input using a single key, a Select/Cancel button 23, a mouthpiece 24 in which a microphone is built, and an earpiece (not shown) in which a speaker is built are installed on the top surface of the first housing 201. On one end of the first housing 201 a pair of first hinge arms 211 are formed to face each other at locations apart from one another. A fixing hole 219 (FIG. 9) is formed on the first housing 201 between the pair of first hinge arms 211 and a release button 209. The release button 209 is assembled to the top surface of the first housing 201 and may extend inwardly. The release button 209 includes a button body 291 (FIG. 9) which is pushed by a user or any suitable external force. The button body 291 is exposed on the top surface of the first housing 201. A release projection 293 extends from the button body 291 and is located in the fixing hole 219.

The second housing 202 is constructed to wrap around the wrist of a user and has a substantially curved shape. The second housing 202 is rotatably engaged with one end of the first housing 201. A keypad 25 includes a plurality of key-buttons installed on the outer surface of the second housing 202. The keypad 25 preferably has a key-button formation with a 3×4 array as a general keypad construction to input numbers and characters. However, alternative suitable arrangements and constructions may be used.

In order to engage the first housing 201, the second housing 202 includes a pair of second hinge arms 221. The second hinge arms 221 are formed on both sides of one end of the second housing 202 and engage with the first housing 201 so as to cover the outer ends of the first hinge arms 211. A pair of third hinge arms 223 are located apart from the second hinge arms 221 and engage with the first housing 201 so as to cover the inner ends of the first hinge arms 211. The first hinge arms 211 are located between the second hinge arms 221 and the third hinge arms 223, respectively. The first, second, and third hinge arms 211, 221, and 223 are engaged using the hinge apparatus 100 and are arranged on the hinge axis A of the hinge apparatus 100.

The third housing 203 is engaged with the other end of the first housing 201. The third housing 203 is located apart from the second housing 202. The housings 202, 203 faces one another and are preferably substantially curvilinear in shape so that a user can easily wear the housings 202, 203 around the wrist. The third housing 203 has the same structure as the second housing 202. The third housing 203 may engage with the first housing 201 or may be constructed as one body with the first housing 201. A speaker may be installed in the third housing 203.

A structure in which the first housing 201 and the second housing 202 are engaged using the hinge apparatus 100 will now be described in detail.

Referring to FIGS. 6-8, the supporting plate 141 of the adjusting screw 104 is limited to movement in the direction of the hinge axis A. This is due to the fact that the supporting plate 141 is supported by the outer end of the outside of one of the first hinge arms 211 and is simultaneously supported by the outer end of the inside of one of the second hinge arms 221. An adjusting head 143 of the adjusting screw 104 is exposed from one end of one of the second hinge arms 221.

The bushing 103 is fixed to one of the third hinge arms 223. Fixing is possible since the coupling projection 133 is formed on the cylindrical surface of the bushing 103 and a coupling recess (not shown) corresponding to the coupling projection 133 is formed inside of the one of the third hinge arms 223. Therefore, when the bushing 103 rotates, the third hinge arms 223 and the second housing 202 rotate. Also, when the second housing 202 rotates, the third hinge arms 223 and the bushing 103 rotate.

One end of the holder 101 is supported by the inner end of one of the third hinge arms 223. Also, the other end of the holder 101 is supported by the supporting screw 105 and limited to movement in the direction of hinge axis A.

The supporting screw 105 sequentially passes through the others of the second, first, and third arms 221, 211, and 223. An end of the supporting screw 105 is in contact with the other end of the holder 101. Here, the stopper washer 153 assembled on the cylindrical surface of the supporting screw 105 is supported by the inner end of the other of the first hinge arms 211 to prevent the supporting screw 105 from being disassembled in the lateral direction of the second housing 202.

Both ends of the holder 101 are supported by the inner end of the one of the third hinge arms 223 and the supporting screw 105, respectively. The supporting plate 141 of the adjusting screw 104 is located between one of the first hinge arms 211 and one of the second hinge arms 221. The end of the supporting screw 105 is in contact with the other end of the holder 101. The stopper washer 153 is supported by the inner end of the other of the first hinge arms 211. Therefore, the adjusting screw 104, the holder 101, and the supporting screw 105 are limited to movement in the direction of hinge axis A.

The supporting screw 105 may be screwed to the other end of the holder 101. In the instant case, the supporting screw 105 also rotates with the holder 101, the hinge shaft 102, the bushing 103, and the adjusting screw 104.

The torsion spring 109 is assembled around the cylindrical surface of the supporting screw 105 and is located at one side of the stopper washer 153. Moreover, the torsion spring 109 is covered by the other of the third hinge arms 223. One of the pair of free ends 193 of the torsion spring 109 is supported by the first housing 201. The other end is supported by the second housing 202.

A hinge cover 199 is engaged between the third hinge arms 223 and the surface of the hinge cover 199 to correspond with the surfaces of the third hinge arms 223. The hinge cover 199 protects such elements of the hinge apparatus 100 exposed to the outside of the holder 101.

FIG. 9 illustrates a state in which a user wears the portable terminal 200 around the wrist. As shown in FIG. 9, when the portable terminal 200 is worn around the wrist, the second housing 202 and the third housing 203 are located so as to face each other. The fixing pin 117 protrudes from the outer cylindrical surface of the holder 101 and engages with the fixing hole 219 formed on the first housing 201. Here, the torsion spring 109 accumulates elasticity operating in a direction in which the second housing 202 extends away from the third housing 203. Therefore, if the user pushes the release button 209 in a direction (1), the fixing pin 117 disengages from the fixing hole 219. Additionally, the second housing 202 moves back in a direction (2) by the elasticity of the torsion spring 109. Accordingly, the user may relatively easily take off the portable terminal 200 worn around the wrist.

When the user intends to wear the portable terminal 200, the user places the portable terminal 200 around the wrist and moves the second housing 202 in the reverse direction of the direction (2). Then the fixing pin 117 moves along a predetermined trace and is engaged with the fixing hole 219. That is, the fixing hole 219 is formed on the moving trace of the fixing pin 117. When the second housing 202 is located so as to face the third housing 203, the fixing pin 117 engages with the fixing hole 219.

The portable terminal 200 is constructed so that a standoff distance (the standoff distance being defined as the distance between respective distal ends of the second and third housings) d1 or d2 between the second housing 202 and the third housing 203 may be adjusted according to the thickness of the wrist of a user when the second housing 202 faces the third housing 203. That is, if the adjusting screw 104 is rotated, the hinge shaft 102 and the bushing 103 are rotated to move the second housing 202 towards and away from the third housing 203. In other words, since the holder 101 and the adjusting screw 104 are limited to move in the direction of the hinge axis A, if the adjusting screw 104 is rotated, the hinge shaft 102 linearly moves and is simultaneously rotated.

A difference between the minimum standoff distance d1 and the maximum standoff distance d2 between the second housing 202 and the third housing 203 depends on the slope and length of the guide hole 111. That is, when the slope and length of the guide hole 111 on the hinge axis is relatively large, the difference between the minimum standoff distance d1 and the maximum standoff distance d2 between the second housing 202 and the third housing 203 is also large. Also, when a pitch of the screw thread 147 formed on the adjusting shaft 145 is relatively small, the standoff distance between the second housing 202 and the third housing 203 may be adjusted more finely since a linearly moving distance of the hinge shaft 102 may be adjusted more precisely.

As described above, in the inventive hinge apparatus and watch type portable terminal therewith, a band, such as a conventional watch chain is replaced by housings harmonized with the terminal. Accordingly, design of the terminal is improved. Also, a space in which various input/output devices, such as a keypad, may be installed and secured by providing at least two rotatably engaged housings. Moreover, a standoff distance between the housings may be adjusted according to the thickness of the wrist of a user using the hinge apparatus.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A watch type portable terminal, comprising:
    a first housing;
    a second housing coupled to one end of the first housing to rotate in a direction toward or away from the first housing over a predetermined angular range;
    a third housing coupled to the other end of the first housing and spaced apart from the second housing so that the second and third housings face each other; and
    a hinge apparatus to rotatably couple the second housing with the first housing, and being configured to adjust a standoff distance between the second and third housings, the hinge apparatus comprising a holder and a fixing pin located on the holder and configured to extend in and out of an outer cylindrical surface of the holder by a predetermined elasticity.

2. The watch type portable terminal of claim 1, further comprising a display device installed on the top of the first housing.

3. The watch type portable terminal of claim 1, further comprising a 4-way key installed on the top of the first housing.

4. The watch type portable terminal of claim 1, further comprising a keypad installed on the top of the second housing having a plurality of key-buttons.

5. The watch type portable terminal of claim 4, wherein the keypad is comprised of key-buttons having a 3×4 arrangement.

6. The watch type portable terminal of claim 1, further comprising a mouthpiece including a microphone installed on the first housing.

7. The watch type portable terminal of claim 1, wherein the holder of the hinge apparatus has at least one guide hole with a predetermined degree of slope that extends in a longitudinal direction, the hinge apparatus further comprising:
    a hinge shaft including a substantially cylindrical surface configured to linearly move in the longitudinal direction of the holder; and
    a guide pin having an end located inside the guide hole, the guide pin being configured to extend through the cylindrical surface of the hinge shaft,
    wherein if the hinge shaft moves linearly in the holder, the guide pin moves along the guide hole so that the hinge shaft rotates in the holder.

8. The watch type portable terminal of claim 7, wherein the at least one guide hole comprises a pair of guide holes located on the holder to face each other, and the guide pin extends through the hinge shaft so that both ends of the guide pin protrude at symmetrical locations.

9. The watch type portable terminal of claim 7, further comprising an adjusting screw, which is screwed to one end of the hinge shaft and linearly moves the hinge shaft about a rotating axis extending in the longitudinal direction of the holder.

10. The watch type portable terminal of claim 7, further comprising a supporting screw which extends in the longitudinal direction, the supporting screw having an end which is in contact with the other end of the holder.

11. The watch type portable terminal of claim 1, wherein the third housing is rotatably engaged with the first housing using a second hinge apparatus.

12. A watch type portable terminal comprising:
a first housing;
a second housing coupled to one end of the first housing to rotate in a direction toward or away from the first housing over a predetermined angular range;
a third housing coupled to the other end of the first housing and spaced apart from the second housing so that the second and third housings face each other; and
a hinge apparatus to rotatably couple the second housing with the first housing, the hinge apparatus being configured to adjust a standoff distance between the second and third housings;
a pair of first hinge arms, which are arranged on the first housing so as to face each other at locations apart from each other;
a pair of second hinge arms, which are arranged on one end of the second housing to face each other to cover the outer ends of the first hinge arms; and
a pair of third hinge arms, which are arranged on one end of the second housing to face each other to cover the inner ends of the first hinge arms;
wherein the first, second, and third hinge arms are arranged on one hinge axis.

13. The watch type portable terminal of claim 12, wherein the hinge apparatus comprising:
a substantially cylindrical holder; a hinge shaft which is linearly moveable in the longitudinal direction of the holder; and
a bushing which is assembled so as to move linearly on the surface of the hinge shaft;
wherein the holder is located near the inner end of one of the third hinge arms, and the bushing is in contact with one end of the holder and simultaneously fixed on the third hinge arm.

14. The watch type portable terminal of claim 13, further comprising an adjusting screw comprised of:
a supporting plate, which is rotatably assembled between one of the first hinge arms and one of the second hinge arms;
an adjusting head, which is extends from one side of the supporting plate and is exposed from one end of the second hinge arm; and
an adjusting shaft, which extends from the other side of the supporting plate and is screwed to one end of the hinge shaft,
wherein when the adjusting screw is rotated, the hinge shaft linearly moves on the holder.

15. The watch type portable terminal of claim 12, wherein the hinge apparatus comprising:
a substantially cylindrical holder; and a supporting screw sequentially passing through the second, first, and third arms,
wherein the holder is located proximate the inner end of the one of the third hinge arms, and the supporting screw is in contact with the other end of the holder so as to limit the holder from moving in the longitudinal direction.

16. The watch type portable terminal of claim 15, further comprising a hinge cover, which is coupled between the third hinge arms so that the surface of the hinge cover is matched to the surfaces of the third hinge arms and covers the holder.

17. The watch type portable terminal of claim 15, further comprising a stopper washer, which is fixed to the cylindrical surface of the supporting screw, the stopper washer is located between the first hinge arm and the second hinge arm to limit the supporting screw from moving in the longitudinal direction.

18. A watch type portable terminal comprising:
a first housing;
a second housing coupled to one end of the first housing to rotate in a direction toward or away from the first housing over a predetermined angular range;
a third housing coupled to the other end of the first housing and spaced apart from the second housing so that the second and third housings face each other;
a hinge apparatus to rotatably couple the second housing with the first housing, the hinge apparatus being configured to adjust a standoff distance between the second and third housings; and
a torsion spring comprising a coil part and a pair of free ends, the pair of free ends extend from the coil part, and one of the free ends is supported by the first housing, and the other of the free ends is supported by the second housing;
wherein the torsion spring provides rotary power to rotate the second housing in a direction away from a location at which the second housing is apart from and faces the third housing.

19. A watch type portable terminal comprising:
a first housing;
a second housing coupled to one end of the first housing to rotate in a direction toward or away from the first housing over a predetermined angular range;
a third housing coupled to the other end of the first housing and spaced apart from the second housing so that the second and third housings face each other; and
a hinge apparatus to rotatably couple the second housing with the first housing, the hinge apparatus being configured to adjust a standoff distance between the second and third housings;
wherein the hinge apparatus comprises
a substantially cylindrical holder having at least one guide hole with a predetermined degree slope that extends in a longitudinal direction;
a hinge shaft including a substantially cylindrical surface configured to linearly move in the longitudinal direction of the holder;
a guide pin having an end located inside the guide hole, the guide pin being configured to extend through the cylindrical surface of the hinge shaft, wherein if the hinge shaft moves linearly in the holder, the guide pin moves along the guide hole so that the hinge shaft rotates in the holder; and
a fixing pin, which is assembled on the holder to extend in and out of an outer cylindrical surface of the holder by a predetermined elasticity to rotate with the second housing, the first housing comprising a fixing hole on a moving trace of the fixing pin, so that when the second housing is located so as to face the third housing, the fixing pin engages with the fixing hole.

20. The watch type portable terminal of claim 19, further comprises a release button, which is assembled to the first housing so as to extend in and release the fixing pin from the fixing hole when the release button extends in by an external force.

21. The watch type portable terminal of claim 20, wherein the release button comprises:
a button body, which is exposed on the top surface of the first housing;
a release projection, which is extends from the inside of the button body and is located in the fixing hole.

22. A watch type portable terminal comprising:
a first housing;
a second housing coupled to one end of the first housing to rotate in a direction toward or away from the first housing over a predetermined angular range;
a third housing coupled to the other end of the first housing and spaced apart from the second housing so that the second and third housings face each other;
a hinge apparatus to rotatably couple the second housing with the first housing, the hinge apparatus being configured to adjust a standoff distance between the second and third housings, and the hinge apparatus comprising
 a substantially cylindrical holder having at least one guide hole with a predetermined degree slope that extends in a longitudinal direction;
 a hinge shaft including a substantially cylindrical surface configured to linearly move in the longitudinal direction of the holder; and
 a guide pin having an end located inside the guide hole, the guide pin being configured to extend through the cylindrical surface of the hinge shaft, wherein if the hinge shaft moves linearly in the holder, the guide pin moves along the guide hole so that the hinge shaft rotates in the holder; and
a bushing, which is assembled so as to move linearly on the cylindrical surface of the hinge shaft, wherein the hinge shaft has a substantially D-shaped cross-section, which extends from one end of the hinge shaft formed on the cylindrical surface of the hinge shaft, and the bushing comprises a through-hole, which has a shape substantially corresponding to a sectional shape of the hinge shaft.

* * * * *

UNITED STATES PATENT AND TRADEMARK OFFICE
CERTIFICATE OF CORRECTION

PATENT NO. : 7,568,263 B2 Page 1 of 1
APPLICATION NO. : 11/101456
DATED : August 4, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Seventh Day of September, 2010

David J. Kappos
*Director of the United States Patent and Trademark Office*